United States Patent [19]
Fischer et al.

[11] 3,718,430
[45] Feb. 27, 1973

[54] FLAME IONIZATION DETECTOR

[75] Inventors: Horst Fischer, Fischbach/Taunus; Manfred Neufelder, Frankfurt am Main, both of Germany

[73] Assignee: Battelle-Entwicklungs-Gesellschaft m.b.H., Frankfurt am Main, Germany

[22] Filed: Jan. 19, 1971

[21] Appl. No.: 107,621

[30] Foreign Application Priority Data

Jan. 24, 1970 Germany..................P 20 03 207.9

[52] U.S. Cl..............23/254 E, 23/232 C, 23/232 E
[51] Int. Cl..................................................G01n 31/12
[58] Field of Search.......23/232 EF, 254 E, 254 EF, 23/255 E

[56] References Cited

UNITED STATES PATENTS

| | | |
|---|---|---|
| 3,027,241 | 3/1962 | Andreatch et al.................23/254 EF |
| 3,372,000 | 3/1968 | Gallaway et al..................23/254 EF |
| 3,399,974 | 9/1968 | Spencer et al....................23/254 EF |
| 3,425,806 | 2/1969 | Karmen............................23/254 EF |
| 3,510,261 | 5/1970 | Fertig..............................23/254 EF |
| 3,542,516 | 11/1970 | Clardy.............................23/254 EF |

*Primary Examiner*—Morris O. Wolk
*Assistant Examiner*—R. E. Serwin
*Attorney*—Gray, Mase & Dunson

[57] ABSTRACT

A housing has an air inlet port and an outlet port. Opposed burner jet assemblies provide flames from electrically conductive jets mounted on insulators. Hydrogen for combustion is supplied through pipes together with a test material and a reagent. A voltage source, amplifier, and meter are connected to detect variations in electrical conductivity of the flames between the jets and thus to detect certain ingredients in the test material.

11 Claims, 1 Drawing Figure

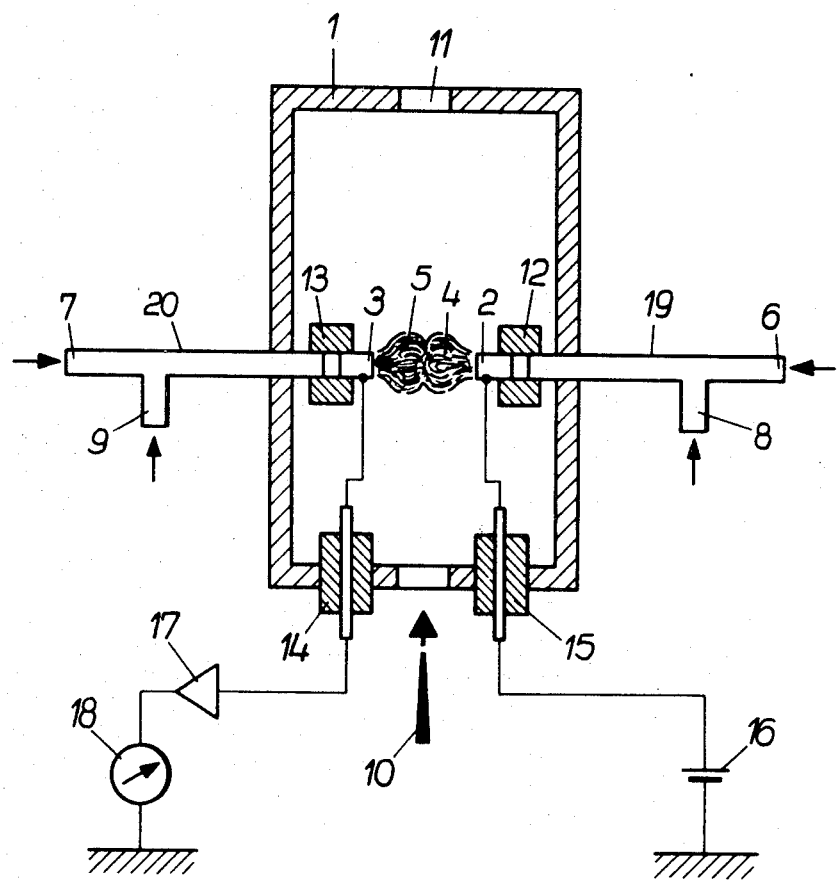

FLAME IONIZATION DETECTOR

BACKGROUND OF THE INVENTION

The invention relates to a flame ionization detector with at least two flames, to which test gases which have to be measured, reagents and combustion gases can be fed through jets, the variation in the electrical conductivity of the flames being measurable.

In gas chromotography it is known to use flame ionization detectors which have one hydrogen flame as an electrode and an associated counter electrode, to give an indication of compounds containing carbon. If carbon is present in the flame, an increased ionization current will flow between the flame and the counter electrode and will be displayed by electrical means.

The counter electrode is cold relative to the flame and therefore inclined to be soiled by the deposition of foreign substances. Such a detector is thus generally speaking unstable in its operation, so that inaccurate or inassessable measuring results are obtained.

Flame ionization detectors with two flames and one counter electrode per flame are also known. The two flames are arranged so as to eliminate the share of a stationary phase of the dividing column in signal formation by measurement of the difference. These detectors also have the disadvantages described in connection with the above mentioned detectors having one flame, since there are again relatively cold counter electrodes which are particularly exposed to the danger of soiling.

SUMMARY OF THE INVENTION

The invention aims to provide a flame ionization detector of the above type, in which precautions are taken to ensure that there is a constantly satisfactory measuring section and thus a satisfactory result of the measurement.

According to the invention this is achieved, in that the jets of the flames are provided as electrodes, and that through the jets the variation in the electrical conductivity of the flames and possibly of the gaps left between the flames can be measured as an indication of chemical elements ionized in the flames. The arrangement according to the invention thus dispenses with the cold counter electrodes which were previously necessary, thus taking away the possibility that combustion products from the flame may be deposited there. With the arrangement according to the invention the combustion products are immediately discharged from the measuring section and removed. One flame is used as the anode and the other as the cathode. In the flame ionization detector according to the invention there is thus always a constant measuring section, which means that the measuring results are always satisfactory. The use of jets as electrodes provides a relatively simple means of leaking off the electric currents which have to be measured, while retaining the advantage that the electrodes are not soiled with combustion products and do not come into contact with them, as the combustion products are only formed behind the jets, as seen in the direction of the gas flow.

According to another feature of the invention, the flames are arranged relative to one another so that their mantles (surfaces) touch or almost touch one another. Such an arrangement has a comparatively high electrical conductivity, so that expensive electric amplifying devices can largely be dispensed with.

A final feature of the invention is that a reagent gas can be fed to one flame and a test gas to the other flame. This construction makes it possible to feed to one flame a reagent, whether as an aerosol or in gas form, and thus to construct the flame ionization detector according to the invention as a specifically indicating detector. For example, by adding cesium bromide vapor to a flame, the detector can be made to give a specific indication of phosphorus in the gas to be tested. The same effect can be obtained by adding potassium hydroxide vapor.

BRIEF DESCRIPTION OF THE DRAWING

The single FIGURE is a diagrammatic view, similar to a front view and largely in vertical cross-section, of a typical flame ionization detector according to the present invention.

DESCRIPTION OF A PREFERRED EMBODIMENT

Burner jet assemblies 19 and 20 are arranged opposite one another in a housing 1. A combustion gas, e.g., hydrogen, flows in through the jet assemblies by way of supply pipes 6 and 7. Into the pipes 6 and 7 there are discharge supply pipes 8 and 9 respective, through which the gases which have to be tested are introduced, usually together with a carrier gas, and possibly a reagent gas. In this case the test gas is passed in through one supply pipe and then the reagent gas through the other supply pipe. As a rule the reagent gas is likewise mixed with a carrier gas.

The actual jets 2 and 3 for the gases flowing out are provided on the jet assemblies by means of insulating pieces 12 and 13. From the jets 2 and 3 electrical leads branch off and are taken through the housing 1 by means of insulating pieces 14 and 15. The lead which branches off from the jet 3 leads to an electrical amplifier 17 and onto an indicating instrument 18 and is then earthed. The electrical lead extending from the jet 2 is earthed by way of a voltage source 16.

The housing 1 further contains apertures 10 and 11. Through the aperture 10 there is supplied or sucked in purified air or oxygen, which are required for the combustion process of flames 4 and 5 emerging from the jets 2 and 3 respectively. Residual oxygen and residual air as well as the waste gases of combustion leave the housing through the aperture 11. The air which enters through the aperture 10 may of course be examined for impurities if it has not been previously cleaned.

When detecting the presence of carbon in the gas which has to be examined, in the example illustrated this gas, the test gas, is introduced through the supply pipe 8. Hydrogen flows in through the pipe 6, and in this way, when the gas mixture has been ignited, the flame 4 is formed at the jet 2. More hydrogen or another combustion gas is supplied simultaneously through the pipe 7, while an inert gas such as nitrogen, argon, or the like, is fed in through the supply pipe 9. In this way, after ignition, the flame 5 is formed at the jet 3. When these two flames are in operation one can read from the indicating instrument that an increased ionization current flows when carbon and/or carbon compounds are present in the test gas flowing in through the supply pipe 8. This increase in the ionization current is a measure of the amount of carbon burning in the two flames of the measuring section.

With the flame ionization detector according to the invention chemical elements other than carbon may also be selectively detected. Thus, for example, a gas containing phosphorus is made to flow in through the supply pipe 8, and if for example cesium chloride vapor is added to the carrier gas in the supply pipe 9, the indicating instrument 18 will here again give a reading which is characteristic of phosphorus both in respect of quality and quantity.

It is clear from the above that the apparatus according to the invention is eminently suitable for use in detecting the various elements in rapid succession. All one has to do for this purpose is to allow or prevent the flow of the appropriate gases through the supply pipes 8 and 9.

In contrast with conventional thermionic flame ionization detectors the detector according to the invention has the important advantage that reagent gas, e.g., the above mentioned cesium vapor, is supplied independently of the combustion gas and that the supply thereof can be well controlled within broad limits. In this way a comparatively speaking highly accurate reading is always obtained. In thermionic detectors on the other hand, the emission of the cesium bromide is controlled, through the temperature, directly by the amount of combustion gas supplied. If there are fluctuations in the supply of combustion gas there will therefore be inaccurate readings, since the emission of the cesium bromide will similarly fluctuate.

A further advantage of the flame ionization detector according to the invention is that, where carbon compounds are being detected, they may be supplied either to both flames together or only to one flame. In either case the reading will be proportional to the amount of carbon fed to the measuring section per unit of time.

We claim:

1. A flame ionization detector comprising at least two burners, each having a jet comprising electrically conductive material, at least one jet being electrically insulated from the others, and means electrically connected to the jets for detecting variations in electrical conductivity in a region between the jets.

2. A detector as in claim 1, wherein the jets are arranged such that, when the burners are alight, the flames can touch or almost touch each other.

3. A detector as in claim 2, comprising also means for conveying a test material to at least one flame.

4. A detector as in claim 3, comprising also means for conveying a reagent to at least one flame.

5. A detector as in claim 2, wherein a combustion material is conveyed to each burner and a test material is conveyed to at least one flame.

6. A detector as in claim 5, wherein the combustion material comprises hydrogen and the test material comprises carbon or a compound thereof.

7. A detector as in claim 5, wherein a reagent is conveyed to at least one flame.

8. A detector as in claim 7, wherein the combustion material comprises hydrogen, the test material comprises phosphorus, and the reagent comprises cesium bromide or potassium hydroxide.

9. A detector as in claim 1, wherein each burner includes a combustion gas supply pipe and at least one burner has a further pipe, in communication with the combustion gas supply pipe, through which a material under test can be conveyed to the burner jet.

10. A detector as in claim 1, wherein the jets are mounted within a housing having a gas inlet port and a gas outlet port.

11. A detector as in claim 1, wherein the means for detecting variations in conductivity comprises a voltage source, an amplifier, and an indicating instrument connected in circuit with the insulated jet and at least one other jet.

* * * * *